US006983468B1

(12) United States Patent
Green et al.

(10) Patent No.: US 6,983,468 B1
(45) Date of Patent: Jan. 3, 2006

(54) AUTOMATED INTERFACE GENERATION FOR COMPUTER PROGRAMS IN DIFFERENT ENVIRONMENTS

(75) Inventors: John H. Green, Toronto (CA); Sandeep K. Minocha, Oakville (CA); Piotr Przybylski, Toronto (CA); John W. Stephenson, Oshawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,409

(22) Filed: May 19, 2000

(30) Foreign Application Priority Data

Nov. 22, 1999  (CA) .................................. 2290167

(51) Int. Cl.
*G06F 9/00*  (2006.01)
(52) U.S. Cl. ...................... 719/331; 718/101; 707/1; 703/22; 703/23; 703/27
(58) Field of Classification Search ............ 709/1–108; 707/8, 1; 719/328; 718/101; 703/22–23, 703/25, 26, 27
See application file for complete search history.

(56) References Cited

U.S. PATENT DOCUMENTS

| 5,036,484 | A | * | 7/1991 | McCoy et al. ................. 703/23 |
| 5,604,896 | A | * | 2/1997 | Duxbury et al. ............... 703/26 |
| 5,619,685 | A |  | 4/1997 | Schiavone |
| 5,623,657 | A |  | 4/1997 | Conner et al. |
| 5,627,979 | A |  | 5/1997 | Chang et al. |
| 5,634,053 | A |  | 5/1997 | Noble et al. |
| 5,812,768 | A | * | 9/1998 | Page et al. ................... 709/228 |
| 5,845,589 | A |  | 12/1998 | Pfister |
| 6,263,497 | B1 | * | 7/2001 | Maeda et al. ................ 717/170 |
| 6,330,711 | B1 | * | 12/2001 | Knutson ..................... 717/100 |
| 6,382,846 | B1 | * | 5/2002 | Lai et al. .................... 712/209 |
| 6,438,744 | B2 | * | 8/2002 | Toutonghi et al. ........... 717/137 |

OTHER PUBLICATIONS

"VisualAge for Smalltalk CICS & IMS Connection Technical Details", CICS & IMS Connection, six pages.
VisualAge for Small Talk CICS & IMS Connection (CICON), by Michael Beisiegel, Building Business Objects from Existing Transaction using Visual Programming, pp. 1-14.
"Integrating Java with Existing Data and Applications on OS/390", by Alex Louwe Kooijmans, et al., International Technical Support Organization, SG24-5142-00, pp. 27-61.

* cited by examiner

*Primary Examiner*—Meng-Al T. An
*Assistant Examiner*—Phuong N. Hoang
(74) *Attorney, Agent, or Firm*—Scully, Scott, Murphy & Presser; Satheesh K. Karra

(57) ABSTRACT

Automated interface generation for computer programs operating in different environments is provided. An automated interface generation system, method, computer program product and article of manufacture is provided comprising an import utility and a runtime environment. The import utility imports a COBOL IMS transaction source file, parses the specified input and output message records, and generates an application programming interface. The application programming interface operates with the runtime environment to take the data values from the language of a different environment and translate them to a formatted IMS input message. This format is derived from the definition of the input message record in the COBOL IMS transaction source file. After the IMS transaction has executed, the resulting IMS output message is translated back to the data values of the language of the different environment, said values including the results of the transaction. The translation step handles data conversion between different code pages, machine architectures, and program semantics, and handles the dynamic nature of IMS messages.

26 Claims, 23 Drawing Sheets

IMSMessage

```
lpage1
    seg1
        mfld1
        mfld2 lpage2
    seg2
        mfld3
        mfld4
    seg3
        mfld5
```

FIG. 5

```
IDENTIFICATION DIVISION.
ENVIRONMENT DIVISION .
DATA DIVISION.
  WORKING-STORAGE SECTION.
   77 FILLER                PIC X(16) VALUE '*** BEGIN WS ***' .

*****************************************************************
*              IMS DECLARATIONS
*****************************************************************
   77 DEF-MOD               PIC X(8) VALUE 'DFSM01  '.
   77 GU-FUNC               PIC X(4) VALUE 'GU  '.
   77 GN-FUNC               PIC X(4) VALUE 'GN  '.
   77 ISRT-FUNC             PIC X(4) VALUE 'ISRT'.
   77 ROLL-FUNC             PIC X(4) VALUE 'ROLL'.
   77 DISPLAY-LL            PIC 9(5).
   77 DISPLAY-ZZ            PIC 9(5).

* begin IMS COBOL input message definition
01 INPUT-MESSAGE.
      02 IN-LL              PIC S9(4) COMP.
      02 IN-ZZ              PIC S9(4) COMP.
      02 IN-TRANCODE        PIC X(8).
      02 IN-DATA.
         03 OP1             PIC 9(4) DISPLAY.
         03 OP2             PIC 9(4) DISPLAY.
         03 FILLER          PIC X(32687).
* end IMS COBOL input message definition

* begin IMS COBOL output message definition
 01 OUTPUT-MESSAGE.
      02 OUT-LL             PIC S9(4) COMP VALUE +8.
      02 OUT-ZZ             PIC S9(4) COMP VALUE +0.
      02 RESULT1            PIC 9(4) DISPLAY.
* end IMS COBOL output message definition
 01 DLI-MSG.
      02 DLIMSG-1           PIC X(18) VALUE 'ERROR ON DLI CALL '.
      02 DLIMSG-CALL        PIC X(10).
      02 DLIMSG-2           PIC X(18) VALUE '. STATUS CODE WAS '.
      02 DLIMSG-STAT        PIC X(2).
      02 DLIMSG-3           PIC X(22) VALUE ' '.

LINKAGE SECTION.
 01 IOPCB.
      02 IO-LTERM           PIC X(8).
      02 IO-RESV            PIC X(2).

02 IO-STATUS          PIC X(2).
      02 IO-DATE            PIC XXXX.
```

FIG. 5A

```
        02  IO-TIME           PIC XXXX.
        02  IO-SEQNO          PIC XXXX.
        02  IO-MODN           PIC X(8).
        02  IO-USERID         PIC X(8).
        02  IO-GROUPID        PIC X(8).

PROCEDURE DIVISION.

ENTRY 'DLITCBL' USING IOPCB .
        PERFORM GET-IMS-MSG UNTIL (IO-STATUS = 'QC').
        GOBACK.

****************************************************************
  * GET IMS MESSAGES FROM INPUT QUEUE AND PROCESS
  ****************************************************************
     GET-IMS-MSG.
        MOVE SPACES                  TO IN-DATA.
        MOVE SPACES                  TO INPUT-MESSAGE.
        CALL 'CBLTDLI' USING GU-FUNC, IOPCB,
                             INPUT-MESSAGE.

EVALUATE IO-STATUS
             WHEN ' '
                COMPUTE RESULT1 = OP1 + OP2
                DISPLAY 'OPERAND 1: ' OP1
                DISPLAY 'OPERAND 2: ' OP2
                DISPLAY 'RESULT 1: ' RESULT1
                PERFORM ISRT-MESSAGE
             WHEN 'QC'
                DISPLAY 'QC STATUS CODE RETURNED '.
             WHEN NOT 'QC'
                MOVE 'GU#MSGQ'  TO DLIMSG-CALL
                MOVE IO-STATUS  TO DLIMSG-STAT
                PERFORM D-RETURN-CODE
        END-EVALUATE.

****************************************************************
  * ERROR ROUTINE TO CATER FOR UNEXPECTED DL1 STATUS CODES
  ****************************************************************
     D-RETURN-CODE.
           DISPLAY DLI-MSG.
           MOVE 0 TO RESULT1.
           PERFORM ISRT-MESSAGE.
           GOBACK.

****************************************************************
  * ROUTINE TO INSERT A MESSAGE TO THE TERMINAL
  ****************************************************************
```

FIG. 5B

```
ISRT-MESSAGE.
      IF IO-MODN = 'MQIMSVS'
*         MOVE 'MQIMSVS'          TO DEF-MOD
          MOVE 'T004002'          TO DEF-MOD
      ELSE
*         MOVE 'DFSM01'           TO DEF-MOD.
          MOVE 'T004002'          TO DEF-MOD.
      MOVE 'T004002'              TO IO-MODN.
      DISPLAY 'DEF-MOD: ' DEF-MOD.
      DISPLAY 'IO-MODN: ' IO-MODN.
      CALL 'CBLTDLI' USING  ISRT-FUNC, IOPCB,
           OUTPUT-MESSAGE, DEF-MOD.
      IF IO-STATUS NOT = SPACES
             MOVE 'ISRT#M'  TO DLIMSG-CALL
             MOVE IO-STATUS TO DLIMSG-STAT
             DISPLAY DLI-MSG
             CALL 'CBLTDLI' USING ROLL- FUNC, IOPCB.
```

FIG. 6

```
MYCLASS .HPP
#ifndef _MYCLASS_HPP_
#define _MYCLASS_HPP_
//
// FILE NAME: myclass.hpp
// include <idaif.hpp>
include <idaifs.hpp>
#include <idabndg.hpp>
#include <idach.hpp>
#include <idamw.hpp>
#include <idauuid.hpp>
include <idaexc.hpp> include <ibag.h>
include <idaifb.hpp>
#include <ixdims.hpp>
#include <ixdimstr.hpp>
#include <ixdimsac.hpp>
#include <ixdimsca.hpp>
#include <ixdimsco.hpp>
#include <ixdimsns.hpp>
#include <ixdimspo.hpp>
#include <ixdimspf.hpp>
#include "myclass.imc"

class myclass :
            public IStandardNotifier,
            public IXDMQIMSConversation,
            public IDAInterfaceBase,
            public virtual myclassDefinition
{
public:

myclass()
   {
      // Tell object to use IMS stubs
      try {
         this->getInterfaceStub (IXDMQIMS ::instance());
      }
      catch (IDANoInterfaceStubException& ex) {
         this->addInterfaceStub (*(new ims_myclass_cstub),
IXDMQIMS::instance());
      }
      // Set up MQI persistence attributes
```

FIG. 6A

```
   this->addAttributes (&IXDMQIMSPersistenceOff::instance());
   this->addAttributes (addFv_name(), &IXDMQIMSPersistenceOff::instance());

pimsco_ = new IXDMQIMSConvAttr((IXDMQIMSConversation *) this);
   this->addAttributes( pimsco_ );

pimsac_ = new IXDMQIMSAccess((char *)getName());
   this->addAttributes(pimsac_);
   IXDMQIMSTransaction *trans;

trans = new IXDMQIMSTransaction("TCLI0040",
                                    '1',
                                    (char *)getName(),
                                    'C'
                                    ,0x20
                                    ,
                                    ,1
                                    ,0
                                    ,0x20
                                    ,
                                    ,1
                                    ,0
   );
   imstatts_.add( (void *) trans );
   this->addAttributes (addFv_name(), trans);

imsns_ = new IXDMQIMSNameService(&IXDMQIMS::instance(), getPrimaryId(),
                                    getSecondaryId(), (char *)getName());

IXDMQIMS::instance().addNameService (imsns_);

// Import from correct place
   this->importBindings(IXDMQIMS::instance());
}
-myclass() {
   if(NULL != pimsco_)
      delete pimsco_;
   if(NULL != pimsac_)
      delete pimsac_;

IXDMQIMSTransaction *tr;
   while(!imstatts_.isEmpty()) {
      tr = (IXDMQIMSTransaction *) imstatts_.anyElement();
      imstatts_.remove(tr);
      delete tr;
   }
   IXDMQIMS::instance().removeNameService (imsns_);
   delete imsns_;
}
```

FIG. 6B

```cpp
    virtual void add ( myclass_add_I* inputMsg, myclass_add_O* outputMsg )
    {
        IDABinding* binding;

if (blist.numberOfElements() == 0)
            ((myclass *)this)->blist =
                    ((myclass *)this)->importBindings();

IBag<IDABinding *>::Cursor current(blist);
        current.setToFirst();
        if (!current.isValid()) {
            throw IDANoBindingException(*(myclass *)this);
        }
        binding = blist.elementAt(current);

IDACallHandle ch = binding->mw()->createCallHandle();
        ch.set(((myclass *)this)->getPrimaryId(),
                ((myclass *)this)->getSecondaryId(),
                addFv_name(), binding);

((myclass *)this)->setAttributes(ch);
        ch.genRequest();
        try {
            ((ims_myclass_cstub *)((myclass
*)this)->getInterfaceStub(*binding->mw()))->add(ch, inputMsg, outputMsg);
            ch.genConfirm();
        } catch (IException& ex) {
            ch.genConfirm();
            throw (ex);
        }
    } private:

IXDMQIMSNameService *imsns_;
    IXDMQIMSConvAttr *pimsco_;
    IXDMQIMSAccess *pimsac_;
    IBag<void *> imstatts_;
};

#endif

MYCLASS .IMC
#ifndef _MYCLASS_IMC_
#define _MYCLASS_IMC_

//
// FILE NAME: myclass.imc
```

FIG. 6C

```
//
#include <ixdimsex.hpp>
#include <idacicch.hpp>
include <ixdimsch.hpp> include "myclass.hpd"

class ims_myclass_cstub :
                    public IDAInterfaceStub,
                    public myclass_stub {
public:

static ims_myclass_cstub& instance()
    {
        if (instance_ == NULL)
            instance_ = new ims_myclass_cstub;
        return (*instance_);
    }
    void add (IDACallHandle& ch, myclass_add_I* inputMsg, myclass_add_O* outputMsg)
    {
        ch.start();
        ch << (myclass_add_I&)(*inputMsg);
        ch.transceive();
        ch >> (myclass_add_O&)(*outputMsg);
        outputMsg->notify();
        ch.done();
    } private :
    static ims_myclass_cstub* instance_;
};
ims_myclass_cstub* ims_myclass_cstub::instance_ = NULL;
endif MYCLASS.HPD
ifndef _MYCLASS_HPD_
#define _MYCLASS_HPD_

// Class: myclass
//
// FILE NAME: myclass.hpd
//
```

FIG. 6D

```
#include <istring.hpp>
#include <idauuid.hpp>
#include <idaifd.hpp>
include <idach.hpp> include "myclass.imd"

class myclassDefinition : public virtual IDAInterfaceDefinition
{
public:

myclassDefinition()
   {
      setSecondaryId (IDAUuid::nil.toString());
      setName ("myclass");
   }

IDAUuid getPrimaryId() {
      return IDAUuid("165c9ec5-2aid-02f0-8000-400011528584");
   }

IString addFv_name() const {
      return IString("void myclass::add( myclass_add_I* inputMsg,
myclass_add_O* outputMsg )");
   } private:

};
class myclass_stub : public virtual myclassDefinition
{
public:
   virtual void add (IDACallHandle& ch, myclass_add_I* inputMsg,
myclass_add_O* outputMsg) = 0;
};

#endif

MYCLASS .IMD
#ifndef _MYCLASS_IMD_
#define _MYCLASS_IMD_
//
// FILE NAME: myclass.imd
// include <istdntfy.hpp>
include <istring.hpp>
#include <idach.hpp>
#include <idacicch.hpp>
```

FIG. 6E

```cpp
#include <inotifev.hpp>
#include <istdntfy.hpp>
include <istring.hpp>
#include <ivseq.h>
#include <ixdimsex.hpp>
include <ixdimstg.hpp> class myclass_add_Lpage1_args {
public:

MYclass_add_Lpage1_args() {
        op1_ = 0;
        op2_ = 0;
    op1_flag_ = 0;
    op2_flag_ = 0;
    } unsigned short int op1_;
    IBoolean op1_flag_;
    unsigned short int op2_;
    IBoolean op2_flag_;
};

inline IDACallHandle& operator<< (IDACallHandle& ch, const myclass_add_Lpage1_args& d)
{
    ch.offsetLL();
    ch <<.IDACICSCallHandleInternal::PIC(ch, "9(4)");
    ch << IDACICSCallHandleInternal::AUG(ch, "DISPLAY_NUMERIC");
    ch << (unsigned short int &)d.op1_;
    ch << IDACICSCallHandleInternal::PIC(ch, "9(4)");
    ch << IDACICSCallHandleInternal::AUG(ch, "DISPLAY_NUMERIC");
    ch << (unsigned short int &)d.op2_;
    ch.setLL();
    return ch;
} class myclass_add_Lpage1 : public IStandardNotifier {
public:

myclass_add_Lpage1()
    {
    }

-myclass_add_Lpage1()
    {
    } myclass_add_Lpage1& operator= (const myclass_add_Lpage1& aLpage1_)
    {
        setop1(aLpage1_.op1());
```

FIG. 6F

```
        setop2(aLpage1_.Op2());
        return *this;
    }
    myclass_add_Lpage1(const myclass_add_Lpage1& aLpage1_)
    {
        setop1(aLpage1_.op1());
        setop2(aLpage1_.op2());
    }
    void notify()
    {
        if (args_.op1_flag_) notifyObservers (INotificationEvent(setop1Id,
*this));
        if (args_.op2_flag_) notifyObservers (INotificationEvent(setop2Id,
*this));
    } unsigned short int op1 () const
    {
        return (args_.op1_);
    } static INotificationId setop1Id;
    myclass_add_Lpage1& setop1 (const unsigned short int& aop1)
    {
        args_.op1_ = aop1;
        notifyObservers (INotificationEvent(setop1Id, *this));
        return *this;
    { unsigned short int op2 () const
    {
        return (args_.op2_);
    } static INotificationId setop2Id;
    myclass_add_Lpage1& setop2 (const unsigned short int& aop2)
    {
        args_.op2_ = aop2;
        notifyObservers (INotificationEvent(setop2Id, *this));
        return *this;
    }
    myclass_add_Lpage1_args args_;

};
inline IDACallHandle& operator<< (IDACallHandle& ch, const myclass_add_Lpage1&
d)
{
```

FIG. 6G

```
      ch << (myclass_add_Lpage1_args &)d.args_;
      return ch;
} class myclass_add_I : public IStandardNotifier {
public:

myclass_add_I()
   {
      Lpage1_.addAsFirst(new myclass_add_Lpage1);
      Lpage1_flag_ = 0;
   }
   ~myclass_add_I()
   {
     while(!Lpage1_.isEmpty()) {
        myclass_add_Lpage1* anElement = Lpage1_.firstElement();
        Lpage1_.removeFirst();
        delete anElement;
     }
   }
   myclass_add_I& operator= (const myclass_add_I& ainputMsg)
   {
     while(!Lpage1_.isEmpty()) {
        myclass_add_Lpage1* anElement = Lpage1_.firstElement();
        Lpage1_.removeFirst();
        delete anElement;
     }
     IVSequence<myclass_add_Lpage1*>::Cursor cursor (ainputMsg.Lpage1_);
     forCursor(cursor)
        Lpage1_.addAsLast(new myclass_add_Lpage1(*cursor.element()));
     notifyObservers (INotificationEvent(Lpage1_Id, .*this));
     Lpage1_flag_ = ainputMsg.Lpage1_flag_;
     return *this;
   } myclass_add_I(const myclass_add_I& ainputMsg)
   {
     IVSequence<myclass_add_Lpage1*>::Cursor cursor(ainputMsg.Lpage1_);
     forCursor(cursor)
        Lpage1_.addAsLast(new myclass_add_Lpage1(*cursor.element()));
     notifyObservers (INotificationEvent(Lpage1_Id, *this));
     Lpage1_flag_ = ainputMsg.Lpage1_flag_;
   } void notify()
   {
      if (Lpage1_flag_) {
         notifyObservers (INotificationEvent(Lpage1_seqId, *this));
         notifyObservers (INotificationEvent(Lpage1_Id, *this));
         notifyObservers (INotificationEvent(setop1Id, *this));
```

FIG. 6H

```
          notifyObservers (INotificationEvent(setop2Id, *this));
      }
  }
      IVSequence<myclass_add_Lpage1*> Lpage1_seq() {
          return (Lpage1_);
      }
      static INotificationId Lpage1_seqId;
      myclass_add_I & setLpage1_seq( IVSequence<myclass_add_Lpage1*> *
  aLpage1_) {
          while(!Lpage1_.isEmpty()) {
            myclass_add_Lpage1* anElement = Lpage1_.firstElement();
            Lpage1_.removeFirst();
            delete anElement;
          }
          IVSequence<myclass_add_Lpage1*>::Cursor cursor(*aLpage1_);
          forCursor (cursor)
            Lpage1_.addAsLast(new myclass_add_Lpage1(*cursor.element()));
          notifyObservers (INotificationEvent(Lpage1_seqId, *this));
          return *this;
      }
      myclass_add_Lpage1 Lpage1__() {
          return (*(Lpage1_.firstElement()));
      }
      static INotificationId Lpage1_Id;
      myclass_add_I & setLpage1__( myclass_add_Lpage1* aLpage1_) {
          while(!Lpage1_.isEmpty()) {
            myclass_add_Lpage1* anElement = Lpage1_.firstElement();
            Lpage1_.removeFirst();
            delete anElement;
          }
          Lpage1_.add(new myclass_add_Lpage1(*aLpage1_));
          notifyObservers (INotificationEvent(Lpage1_Id, *this));
          return *this;
      }
           unsigned short int      op1 (    )            const
       {
       return ( Lpage1_.firstElement()->op1());
       }
          static INotificationId setop1Id;
       myclass_add_I &     setop1 (    const unsigned short int& aop1
  )
       {
       Lpage1_.firstElement()->setop1(aop1);
       notifyObservers (INotificationEvent(setop1Id, *this));
       return *this;
       }
           unsigned short int      op2 (    )            const
       {
```

FIG. 6I

```
        return ( Lpage1_.firstElement() ->op2());
    }
        static INotificationId setop2Id;
        myclass_add_I &    setop2 (    const unsigned short int& aop2
)
    {
        Lpage1_.firstElement()->setop2(aop2);
        notifyObservers (INotificationEvent(setop2Id, *this));
        return *this;
    }

IVSequence<myclass_add_Lpage1*> Lpage1_;
    IBoolean Lpage1_flag_;

};
inline IDACallHandle& operator<< (IDACallHandle& ch, myclass_add_I& d)
{
    IVSequence<myclass_add_Lpage1 *>::Cursor cursor(d.Lpage1_);
    forCursor(cursor) {
      ch << d.Lpage1_.elementAt(cursor);
      d.Lpage1_flag_ = 1;
    }
    ch.setPageBit();
    ch.stripNullSegments();
    return Ch;
}
class myclass_add_Lpage2_result {
public:

myclass_add_Lpage2_result() {
       result1_ = 0;
    result1_flag_ = 0;
} unsigned short int result1_;
    IBoolean result1_flag_;
};

inline IDACallHandle& operator>> (IDACallHandle& ch,
myclass_add_Lpage2_result& d)
{
    if (ch.notNullsegment() && ch.stripLL()) {
       ch >> IDACICSCallHandleInternal::PIC(ch, "9(4)");
       ch >> IDACICSCallHandleInternal::AUG(ch, "DISPLAY_NUMERIC");
       ch >> (unsigned short int &)d.result1_;
       if (ch.fieldIsSet()) d.result1_flag_ = 1;
```

FIG. 6J

```
    }
    return ch;
}
class myclass_add_Lpage2 : public IStandardNotifier {
public:

myclass_add_Lpage2()
    {
    }

~myclass_add_Lpage2()
    {
    } myclass_add_Lpage2& operator= (const myclass_add_Lpage2& aLpage2_)
    {
        setresult1(aLpage2_.result1());
        return *this;
    } myclass_add_Lpage2(const myclass_add_Lpage2& aLpage2_)
    {
        setresult1(aLpage2_.result1());
    }
    void notify()
    {
        if (result_.result1-flag-J
notifyObservers (INotificationEvent (setresult1Id, *this)):
    } unsigned short int result1 ()      const
    {
        return (result_.result1_);
    } static INotificationId setresult1Id;
    myclass_add_Lpage2& setresult1 (const unsigned short int& aresult1)
    {
        result_.result1_ = aresult1;
        notifyObservers (INotificationEvent(setresult1Id, *this));
        return *this;
    } myclass_add_Lpage2_result result_;
};
```

FIG. 6K

```
inline IDACallHandle& operator>> (IDACallHandle& ch, myclass_add_Lpage2& d)
{
   ch >> (myclass_add_Lpage2_result &)d.result_;
   return ch;
}
class myclass_add_O : public IStandardNotifier {
public:

myclass_add_O()
   {
      Lpage2_.addAsFirst(new myclass_add_Lpage2);
      Lpage2_flag_= 0;
   }
   ~myclass_add_O()
   {
     while(!Lpage2_.isEmpty()) {
        myclass_add_Lpage2* anElement = Lpage2_.firstElement();
        Lpage2_.removeFirst();
        delete anElement;
     }
   }
   myclass_add_O& operator= (const myclass_add_O& aoutputMsg)
   {
     while(!Lpage2_.isEmpty()) {
        myclass_add_Lpage2* anElement = Lpage2_.firstElement ();
        Lpage2_.removeFirst();
        delete anElement;
     }
     IVSequence<myclass_add_Lpage2*>::Cursor cursor(aoutputMsg.Lpage2_);
     forCursor(cursor)
        Lpage2_.addAsLast(new myclass_add_Lpage2(*cursor.element()));
     notifyObservers (INotificationEvent(Lpage2_Id, *this));
     Lpage2_flag_ = aoutputMsg.Lpage2_flag_;
     return *this;
   }
   myclass_add_o(const myclass_add_O& aoutputMsg)
   {
     IVSequence<myclass_add_Lpage2*>::Cursor cursor(aoutputMsg.Lpage2_);
     forCursor(cursor)
        Lpage2_.addAsLast(new myclass_add_Lpage2(*cursor.element()));
     notifyObservers (INotificationEvent(Lpage2_Id, *this));
     Lpage2_flag_ = aoutputMsg.Lpage2_flag_;
   }
   void notify()
   {
      if (Lpage2_flag_) {
         notifyObservers (INotificationEvent(Lpage2_seqId, *this));
         notifyObservers (INotificationEvent(Lpage2_Id, *this));
         notifyObservers (INotificationEvent(setresult1Id, *this));
```

FIG. 6L

```
        }
     }
        IVSequence<myclass_add_Lpage2*> Lpage2_seq() {
           return (Lpage2_);
        }
        static INotificationId Lpage2_seqId;
        myclass_add_O & setLpage2_seq( IVSequence<myclass_add_Lpage2*> *
aLpage2_) {
           while(!Lpage2_.isEmpty()) {
              myclass_add_Lpage2* anElement = Lpage2_.firstElement();
              Lpage2_.removeFirst();
              delete anElement;
           }
           IVSequence<myclass_add_Lpage2*>::Cursor cursor(aLpage2_);
           forCursor(cursor)
              Lpage2_.addAsLast(new myclass_add_Lpage2(*cursor.element()));
           notifyObservers (INotificationEvent(Lpage2_seqId, *this));
           return *this;
        }
        myclass_add_Lpage2 Lpage2__() {
           return (*(Lpage2_.firstElement()));
        }
        static INotificationId Lpage2_Id;
        myclass_add_O & setLpage2__( myclass_add_Lpage2* aLpage2_) {
           while(!Lpage2_.isEmpty()) {
              myclass_add_Lpage2* anElement = Lpage2_.firstElement();
              Lpage2_.removeFirst();
              delete anElement;
           }
           Lpage2_.add(new myclass_add_Lpage2(*aLpage2_));
           notifyObservers (INotificationEvent(Lpage2_Id, *this));
           return *this;
        }
             unsigned short int     result1 (    )            const
        {
           return ( Lpage2_.firstElement()->result1());
        }
           static INotificationId setresult1Id;
           myclass_add_O &     setresult1 (   const unsigned short int&
aresult1    )
           Lpage2_.firstElement()->setresult1(aresult1);
           notifyObservers (INotificationEvent(setresult1Id, *this));
           return *this;
        }
     IVSequence<myclass_add_Lpage2*> Lpage2_;
     IBoolean Lpage2_flag_;
};
inline IDACallHandle& operator>> (IDACallHandle& ch, myclass_add_O& d)
{
```

FIG. 6M

```
  while (ch.notAtEndOfBuffer()) {
    while(!d.Lpage2_.isEmpty()) {
      myclass_add_Lpage2* anElement = d.Lpage2_.firstElement();
      d.Lpage2_.removeFirst();
      delete anElement;
    }
    myclass_add_Lpage2 tempLpage2_;
    while (ch.notAtEndOfBufferOrSeq(0, 1, "0")) {
      ch >> (myclass_add_Lpage2 &) tempLpage2_;
      d.Lpage2_.addAsLast(new myclass_add_Lpage2(tempLpage2_));
      d.Lpage2_flag_ = 1;
    }
    if (!ch.unmarshalLPAGE()) {
      if (ch.notNullSegment()) {
        throw IXDMQIMSException((const char *)
            IMessageText(160, IXDMQIMS_MSG_FILE) );
      } else {
        throw IXDMQIMSException((const char *)
            IMessageText(161, IXDMQIMS_MSG_FILE) );
      }
    }
  }
  return ch;
}
endif MYCLASS.VBE
//VBBeginpartInfo: myclass
//VBParent: IStandardNotifier
//VBIncludes: "myclass.hpp" _MYCLASS_HPP_
//VBPartDataFile: myclass.vbb
//VBConstructor: myclass()
//VBComposerInfo: nonvisual
//VBLibFile: idacom.lib
//VB: idaims10.lib
//VBEvent: ready,"ready", readyId
//VBAction: add,"add method",void,add(myclass_add_I* inputMsg,myclass_add_O* outputMsg)
//VBPreferredFeatures: add, enabledForNotification, this
//VBEndPartInfo: myclass
//VBBeginPartInfo: myclass_add_I
//VBParent: IStandardNotifier
//VBIncludes: "myclass.hpp" _MYCLASS_HPP_
//VBPartDataFile: myclass.vbb
//VBConstructor: myclass_add_I()
//VBComposerInfo: nonvisual
//VBEvent: ready,"ready", readyId
//VBAttribute: Lpage1_seq, "Lpage1_seq", IVSequence<myclass_add_Lpage1*>,
IVSequence<myclass_add_Lpage1*> Lpage1_seq(), myclass_add_I & setLpage1_seq(
IVSequence<myclass_add_Lpage1*> * aLpage1_), Lpage1_seqId
```

FIG. 6N

```
//VBAttribute: Lpage1_, "Lpage1_", myclass_add_Lpage1, myclass_add_Lpage1
Lpage1__(), myclass_add_I & setLpage1__( myclass_add_Lpage1* aLpage1_),
Lpage1_Id
//VBAttribute: op1_,"op1",unsigned short int,unsigned short int
op1(),myclass_add_I & setop1(unsigned short int aop1),setop1Id
//VBAttribute: op2_,"op2",unsigned short int,unsigned short int
op2(),myclass_add_I & setop2(unsigned short int aop2),setop2Id
//VBPreferredFeatures: Lpage1_seq, Lpage1_, op1_, op2_  this
//VBEndPartInfo: myclass_add_I
//VBBeginPartInfo: myclass_add_Lpage1
//VBParent: IStandardNotifier
//VBIncludes: "myclass.hpp" _MYCLASS_HPP_
//VBPartDataFile: myclass.vbb
//VBConstructor: myclass_add_Lpage1()
//VBComposerInfo: nonvisual
//VBEvent: ready,"ready", readyId
//VBAction: operator=,"Assigns
myclass_add_Lpage1",myclass_add_Lpage1&,operator=(const myclass_add_Lpage1&
aLpage1_)
//VBAttribute: op1_,"op1",unsigned short int,unsigned short int op1(),
myclass_add_Lpage1 & setop1(unsigned short int aop1),setop1Id
//VBAttribute: op2_,"op2",unsigned short int,unsigned short int op2(),
myclass_add_Lpage1 & setop2(unsigned short int aop2),setop2Id
//VBPreferredFeatures: operator=, op1_, op2_, this
//VBEndPartInfo: myclass_add_Lpage1
//VBBeginPartInfo: myclass_add_O
//VBParent: IStandardNotifier
//VBIncludes: "myclass.hpp" _MYCLASS_HPP_
//VBPartDataFile: myclass.vbb
//VBConstructor: myclass_add_O()
//VBComposerInfo: nonvisual
//VBEvent: ready,"ready", readyId
//VBAttribute: Lpage2_seq, "Lpage2_seq", IVSequence<myclass_add_Lpage2*>,
IVSequence<myclass_add_Lpage2*> Lpage2_seq(), myclass_add_O & setLpage2_seq(
IVSequence<myclass_add_Lpage2*> * aLpage2_), Lpage2_seqId
//VBAttribute: Lpage2_, "Lpage2_", myclass_add_Lpage2, myclass_add_Lpage2
Lpage2__(), myclass_add_O & setLpage2__( myclass_add_Lpage2* aLpage2_),
Lpage2_Id
//VBAttribute: result1_,"result1",unsigned short int,unsigned short int
result1(),myclass_add_O & setresult1(unsigned short int aresult1),setresult1Id
//VBPreferredFeatures: Lpage2_seq, Lpage2_, result1_, this
//VBEndPartInfo: myclass_add_O
//VBBeginpartInfo: myclass_add_Lpage2
//VBParent: IStandardNotifier
//VBIncludes: "myclass.hpp" _MYCLASS_HPP_
//VBPartDataFile: myclass.vbb
//VBConstructor: myclass_add_Lpage2()
//VBComposerInfo: nonvisual
//VBEvent: ready,"ready", readyId
```

FIG. 60

```
//VBAction: operator=,"Assigns
myclass_add_Lpage2",myclass_add_Lpage2&,operator=(const myclass_add_Lpage2&
aLpage2_)
//VBAttribute: result1_,"result1",unsigned short int,unsigned short int
result1(), myclass_add_Lpage2 & setresult1(unsigned short int
aresult1),setresult1Id
//VBPreferredFeatures: operator=, result1_, this
//VBEndPartInfo: myclass_add_Lpage2

MYCLASS.CPP
//
//FILE NAME: myclass.cpp
// include "myclass.imd"
INotificationId myclass_add_I::Lpage1_seqId = "Lpage1_seqId";
INotificationId myclass_add_I::Lpage1_Id = "Lpage1_Id";
INotificationId myclass_add_I::setop1Id = "setop1Id";
INotificationId myclass_add_Lpage1::setop1Id = "setop1Id";
INotificationId myclass_add_I::setop2Id = "setop2Id";
INotificationId myclass_add_Lpage1::setop2Id = "setop2Id";
INotificationId myclass_add_O::Lpage2_seqId = "Lpage2_seqId";
INotificationId myclass_add_O::Lpage2_Id = "Lpage2_Id";
INotificationId myclass_add_O::setresult1Id = "setresult1Id";
INotificationId myclass_add_Lpage2::setresult1Id = "setresult1Id";.
```

AUTOMATED INTERFACE GENERATION FOR COMPUTER PROGRAMS IN DIFFERENT ENVIRONMENTS

BACKGROUND OF THE INVENTIONS

TECHNICAL FIELD

The invention relates to automated generation of interfaces to programs in different environments. Particularly, the invention relates to automated generation of interfaces to programs designed for and operating on IBM Corporation's IMS® (Information Management System) transaction and database server system so as to support the dynamic composing and reading of data messages exchanged between an interfacing program and the program operating on the IMS system.

PRIOR ART

An attribute of modern computer systems is that they support many programming environments, such as the Java™, C, C++, PASCAL, FORTRAN, COBOL and BASIC computer language environments. Further, many distributed computing systems today provide a client-server model in which a client program can run and interact with a server program, where often the client program and server program run on different systems in a computer network.

Thus, in a distributed environment including possibly many different computer systems supporting any number of different programming environments, sharing of data between different program environments is becoming increasingly important. Particularly, there is a need in new program environments to access services or data provided by older program environments often through distributed computing systems.

An example of where there is a need for such cross-environment access is with modern object-oriented languages having access to data or services of IMS systems. An IMS system is a complete online transaction processing environment that provides continuous availability and data integrity. An IMS system comprises a database and a data communication system. The IMS database system provides for management and storage of data and processes concurrent database calls. The IMS data communication system provides high-volume, high-performance, high-capacity transaction processing for the IMS database system.

In IMS systems, many IMS legacy programs are written in COBOL. In order to perform transactions with these COBOL IMS programs using programs in another computer programming language environment such as a C++ or Java language environment, a programmer must:

Map between the other computer language data types and the COBOL data types;
  Translate the data and semantics of the other computer language into data corresponding to the COBOL data type(s), wherein the data must be aligned according to COBOL alignment rules;
  Connect the IMS system and the system containing the programs in the other language in order to allow passage of data between the systems;
  Format the data passing from the programs written in the other language to the IMS system into an IMS message format; and
  Translate the data returned from the IMS system, which is in an IMS message format with its contained COBOL data types, to data corresponding to the other computer language data type(s).

An IMS connection feature called CICON of the IBM® VisualAge® for Smalltalk application development product provides access to transaction applications having MFS (message formatting services) panels running under an IMS system. Notably however, CICON only allows access to panel driven applications defining at least one panel using MFS. To provide such access, the VisualAge for Smalltalk product provides a parser for importing the MFS definitions and tools to recreate panel navigation based on user input. The parser and tools provide the capability to embody a series of interactions, without any user access, into one navigation and provides a way of mapping this navigation to an object developed in the VisualAge for Smalltalk environment. However, a disadvantage of CICON is that only transactions with defined MFS panels can be accessed. Since it is not required for an IMS transaction to define such panels, CICON does not optimally allow access to all legacy business applications.

A second tool that allows access to legacy applications is the CICS®/ECI access tool included with the IBM VisualAge for Java, Enterprise Edition application development product. This tool allows access to COBOL transactions running under the IBM CICS (Customer Information Control System) software system. This tool uses a parser to import a COBOL program in the CICS system and to generate stubs for communicating and exchanging data with the CICS system. The disadvantage of this tool is its static definition of the data to be exchanged with the CICS system. Once the stubs are generated, the contents of the data buffer to be sent or received from the CICS system cannot be changed. Rather, an IMS system uses input and output messages for interacting with IMS transactions and the content of these messages is dynamic, in that the message defines its size and layout. The COBOL IMS transaction source file input and output message records define data types and also, in part, the layout, but not the actual size of, the messages exchanged. Therefore, it is not possible to use the CICS tool to access COBOL transactions running in an IMS system.

Thus, it would be advantageous to provide a program runtime capable of reading and composing the IMS message data stream of an IMS system (or any analogous system or environment) as well as providing an import utility with the capability of generating interface stubs capable of handling the dynamic nature of that message data stream.

SUMMARY OF THE INVENTION

The invention provides for automated generation of interfaces to programs in different environments. Particularly, the invention provides for automated generation of interfaces to programs designed for and operating on IBM Corporation's IMS® (Information Management System) transaction and database server system so as to support the dynamic composing and reading of data messages exchanged between an interfacing program and the program operating on the IMS system.

There is provided a method for interfacing a program on an IMS system to a program in another program environment, comprising the steps of scanning an IMS transaction with the program on the IMS system; and generating a program interface, the program interface providing means for invoking the IMS transaction and converting data between the IMS transaction and the program in another program environment. The above method may also be provided wherein the interface comprises a transaction part which provides for invoking the IMS transaction; a message part which provides for composing or reading an IMS message; and a lpage part which provides for dynamic composing or reading of an IMS message. The above methods may also further comprise the step of providing a runtime, the runtime comprising means for translating data types of the program in another program environment to data types used in a message to the IMS system; means for composing the message to the IMS system; means for translating data types used in a message from the IMS system to data types of the program in another program environment; and means for reading the message from the IMS system. And the runtime may further comprise means for accessing the IMS transaction via the MQSeries messaging interface. Further, the above methods may comprise the step of compiling the program interface into the program in another program environment. And some of the above methods may further comprise the step of compiling the runtime into the program in another program environment. And, the above methods may further comprise the step of providing means for converting code pages between the another program environment and the IMS system.

There is also provided a computer program product for interfacing a program on an IMS system to a program in another program environment, comprising instruction means for scanning an IMS transaction with the program on the IMS system; and instruction means for generating a program interface, the program interface providing means for invoking the IMS transaction and converting data between the IMS transaction and the program in another program environment. The above computer program product may also be provided wherein the interface comprises a transaction part which provides for invoking the IMS transaction; a message part which provides for composing or reading an IMS message; and a lpage part which provides for dynamic composing or reading of an IMS message. The above computer program products may further comprise instructions means for providing a runtime, the runtime comprising means for translating data types of the program in another program environment to data types used in a message to the IMS system; means for composing the message to the IMS system; means for translating data types used in a message from the IMS system to data types of the program in another program environment; and means for reading the message from the IMS system. And, the runtime may further comprise means for accessing the IMS transaction via the MQSeries messaging interface. And the above computer program products may further comprise instruction means for compiling the program interface into the program in another program environment. And some of the above computer program products may further comprise instruction means for compiling the runtime into the program in another program environment. And, the above computer program products may further comprise instruction means for converting code pages between the another program environment and the IMS system.

Further, there is provided a computer program product for interfacing a program on an IMS system to a program in another program environment, comprising instruction means for scanning an IMS transaction with the program on the IMS system producing a data description of said IMS transaction; and instruction means for using said data description to generate code for invoking said IMS transaction. The above computer program product may further comprise instruction means for using said data description to generate code to process message elements of said IMS transaction for use with the program in another language environment.

Also provided is a computer program product for interfacing a program on an IMS system to a program in another program environment, comprising instruction means for invoking an IMS transaction with the program on the IMS system; and instruction means for converting data between the IMS transaction and the program in another program environment. The above computer-program product may also be provided wherein the instruction means for converting further comprises instruction means for translating data types of the program in another program environment to data types used in a message to the IMS system; instruction means for composing the message to the IMS system; instruction means for translating data types used in a message from the IMS system to data types of the program in another program environment; and instruction means for reading the message from the IMS system. The above computer program products may also be provided wherein the instruction means for converting further comprises instruction means for accessing the IMS transaction via the MQSeries messaging interface. And the above computer program products may further comprise instruction means for converting code pages between the another program environment and the IMS system.

There is also provided an article of manufacture comprising a computer usable medium having computer readable program code means therein for executing the method steps of any one of the above methods.

Also provided is a system for interfacing a program on an IMS system to a program in another program environment, comprising means for scanning an IMS transaction with the program on the IMS system; and means for generating a program interface, the program interface providing means for invoking the IMS transaction and converting data between the IMS transaction and the program in another program environment. The above system may further comprise means for providing a runtime, the runtime comprising means for translating data types of the program in another program environment to data types used in a message to the IMS system; means for composing the message to the IMS system; means for translating data types used in a message from the IMS system to data types of the program in another program environment; and means for reading the message from the IMS system.

There is further provided a system for interfacing a program on an IMS system to a program in another program environment, comprising means for scanning an IMS transaction with the program on the IMS system producing a data description of said IMS transaction; and means for using said data description to generate code for invoking said IMS transaction. The above system may further comprise means for using said data description to generate code to process message elements of said IMS transaction for use with the program in another language environment.

A system for interfacing a program on an IMS system to a program in another program environment is also provided comprising means for invoking an IMS transaction with the program on the IMS system; and means for converting data between the IMS transaction and the program in another program environment. The above system is also provided wherein the means for converting further comprises means for translating data types of the program in another program environment to data types used in a message to the IMS system; means for composing the message to the IMS system; means for translating data types used in a message from the IMS system to data types of the program in another program environment; and means for interpreting the message from the IMS system.

BRIEF DESCRIPTION OF THE DRAWINGS

The preferred embodiments of the present invention will now be described, by way of example only, with reference to the accompanying drawings in which:

FIG. 5 is source code of a simple COBOL IMS transaction that is supplied two numbers as input which the COBOL IMS program then adds and returns the result; and FIG. 6 is the resulting generated C++ classes from the import utility using the simple COBOL IMS transaction in FIG. 5 as input.

DETAILED DESCRIPTION OF THE PREFERRED EMBODIMENTS OF THE INVENTION

Figure 1:
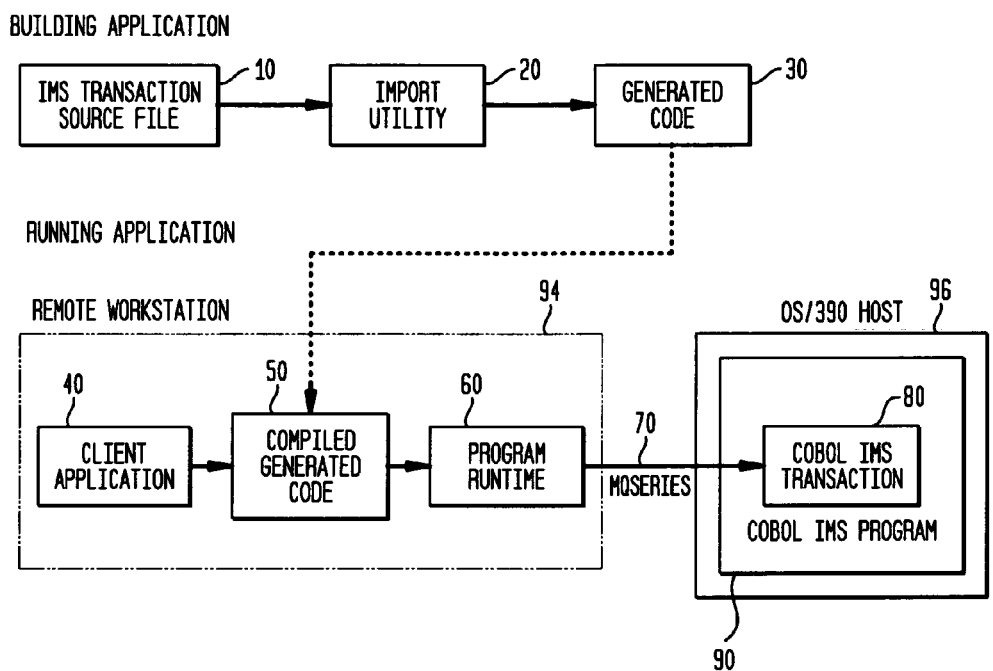
FIG. 1 shows in diagrammatic form the components of a system for automated interface generation according to the present invention.

The preferred embodiment of the present invention provides a system, method, computer program product and article of manufacture for generating an interface which defines a mapping from a COBOL program designed for and operating on an IMS system (hereafter COBOL IMS program) to a computer program written in another computer language such as the C++ and Java languages, for invoking an IMS transaction with the COBOL IMS program (hereafter a COBOL IMS transaction) and for formatting and converting the COBOL IMS transaction data passing between the COBOL IMS program and the program written in the other computer language. The present invention creates an interface which handles the mapping of data types and different program semantics between COBOL and the other language, translates the data types between COBOL and the other language, handles conversion between code pages and machine architectures of the systems operating the COBOL IMS program and the program written in the other language, formats the data from the program written in the other language into an IMS input message to the COBOL IMS program, and converts an IMS output message from the COBOL IMS program into data usable by the program written in the other language.

Particularly, the present invention provides an import utility for interfacing a COBOL IMS program to a program in another program language environment, the import utility comprising a means for scanning the COBOL IMS transaction and generating a program interface, the program interface providing a means for invoking the COBOL IMS transaction and for converting data between the COBOL IMS transaction and the program in the other program environment. The generated program interface comprises three parts: (a) a transaction part which provides means for invoking an IMS transaction; (b) a message part which provides means for composing or reading an IMS input or output message respective; and (c) a lpage part which provides the means for dynamic composing or reading of an IMS message. These parts support visual and non-visual programming in the other language.

Further, the present invention also provides a program runtime for the generated program interface. The program runtime provides a generic means for invoking a COBOL IMS transaction using the IBM MQSeriesO messaging interface, for formatting data from the program written in the other language into an IMS input message, and for converting an IMS output message into data usable by the program written in the other language. The interfaces generated by the import utility together with the program runtime allow access to COBOL IMS transactions in, preferably, a distributed environment.

It should be apparent to those skilled in the art that the present invention may be implemented on systems other than IMS systems. The invention may be implemented on systems that provide substantially the same functionality as an IMS system. Similarly, the invention may be implemented on systems that provide just some or all of the key features/functionality that the invention uses and/or addresses. Further, the invention may be implemented in whole or in part as software which software may be stored and/or operated on one or more machines in one or more interconnected systems.

Referring to FIG. 1, a schematic of the preferred embodiment of the invention for providing an interface to a COBOL IMS transaction 80 with a COBOL IMS program 90 from a client application 40 written in another computer language, for invoking the COBOL IMS transaction, and for formatting and converting COBOL IMS transaction data passing between the client application and the COBOL IMS program is depicted. Generally, the COBOL IMS transaction source file 10 is passed into import utility 20. In the import utility, the COBOL IMS transaction source file is parsed and the results are used to create the generated code 30 which defines the interface with the COBOL IMS transaction. The generated code is used to form the compiled generated code stub 50 which works with the program runtime 60 of the invention and the client application to invoke the COBOL IMS transaction through MQSeries messaging services 70 and to format and convert the COBOL IMS transaction data passing between the client application and the COBOL IMS program.

In the preferred embodiment, the import utility is integrated into a software application development program, such as the IBM VisualAge C++ software development tool, and the development program provides compilation of the generated code and the inclusion of the runtime and the compiled generated code stub into the client application. It should be apparent to those skilled in the art however that the import utility may operate on a standalone basis and interact with other tool(s) that facilitate compilation and provision of the runtime functionality of the invention. Additionally, the import utility may be designed from 'scratch' or simply be an extension of a code generator (which are well-known in the art).

Further, in the preferred embodiment, the import utility will create the generated code on a remote workstation 94 (remote relative to the IMS system) for compilation with the client application and the runtime on the remote workstation. And, in the preferred embodiment, the client application (along with the compiled generated code and the runtime) run on the remote workstation which is connected by MQSeries messaging services and hardware connections to the IMS system, typically an OS/390a host computer 96, all more particularly depicted in FIG. 1. However, it should be apparent to those skilled in the art that any number of different hardware configurations and system interconnection topologies could be used in accordance with the invention. Without limitation, any one or any combination of the components generally described in FIG. 1, e.g., the import utility, the client application, the runtime, the compiled generated code, etc. could operate on the same or different workstations or systems. Indeed, all components of the invention could operate on the IMS system host.

More particularly, the import utility facilitates the creation of an interface for a client application 40 written in another computer language to a COBOL IMS transaction with a COBOL IMS application program by reading the IMS transaction source file 10. In the preferred embodiment, the IMS transaction source file, which is initially located on the file system of the IMS system host, is read from the file system of the computer environment in which the import utility operates. In the preferred embodiment, the user inputs IMS transaction information to the import utility by way of command line arguments passed when invoking the import utility. The user specifies the name of the COBOL IMS transaction to be invoked, the name of the IMS transaction source file containing relevant message definitions, the name of the main class to be generated by the import utility and the name of the method representing the COBOL IMS transaction invocation. The user is also required to specify the names of the COBOL data structures representing the input and output messages. These messages are interpreted as arguments to the aforementioned method. It should be apparent to those skilled in the art that input of arguments could equally be provided by a graphical user interface means, provided to the import utility by a program invoking the import utility, or provided by any other conventional input means, whether manual or automatic.

Figures 2, 3:
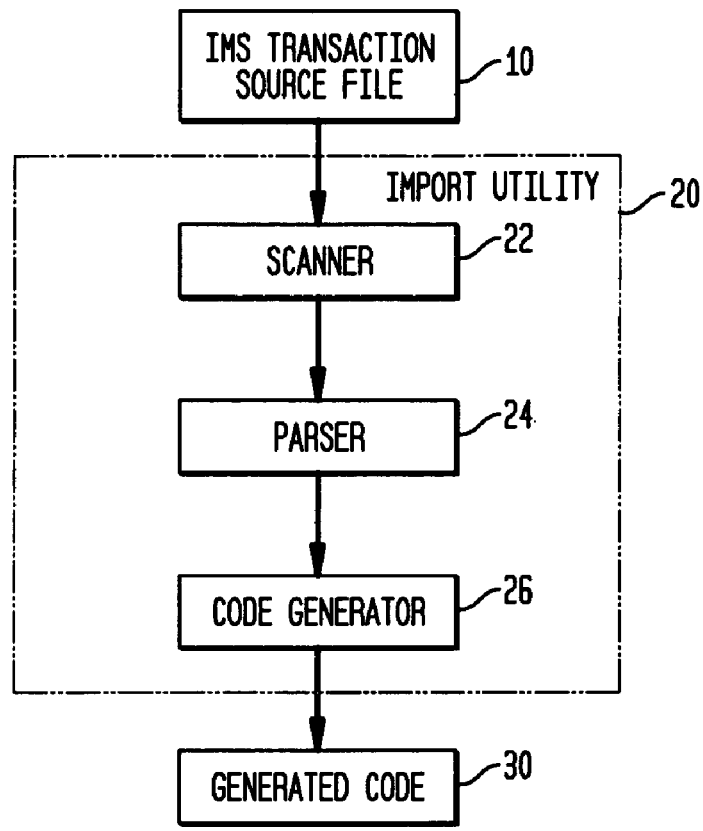
FIG. 2 is a diagram depicting the import utility of FIG. 1 in detail.
FIG. 3 depicts the structure of an example IMS message used by the invention.
Figure 4A:
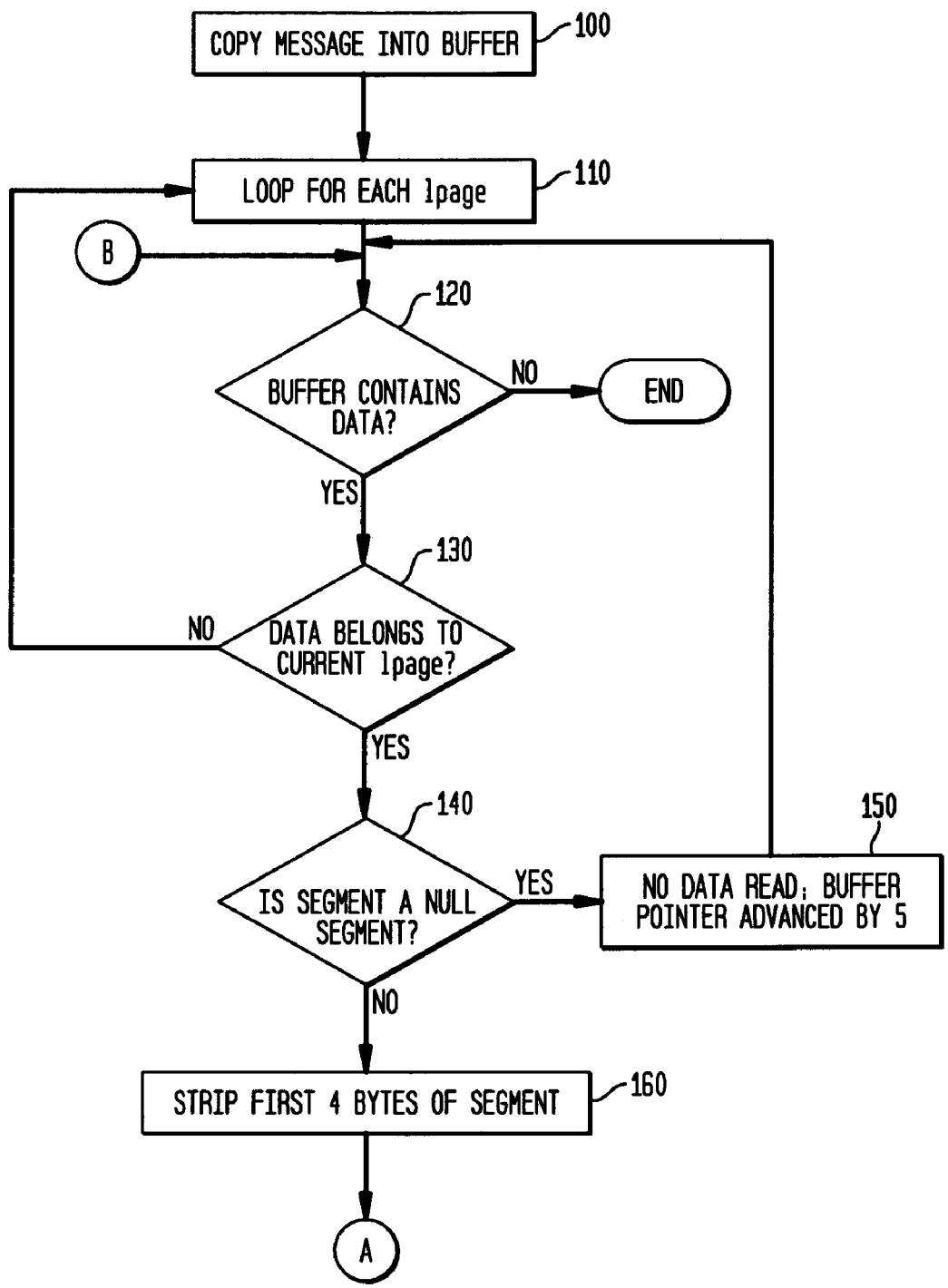
FIGS. 4A and 4B is a flowchart of the data extraction of IMS messages by the runtime of the present invention.
Figure 4B:
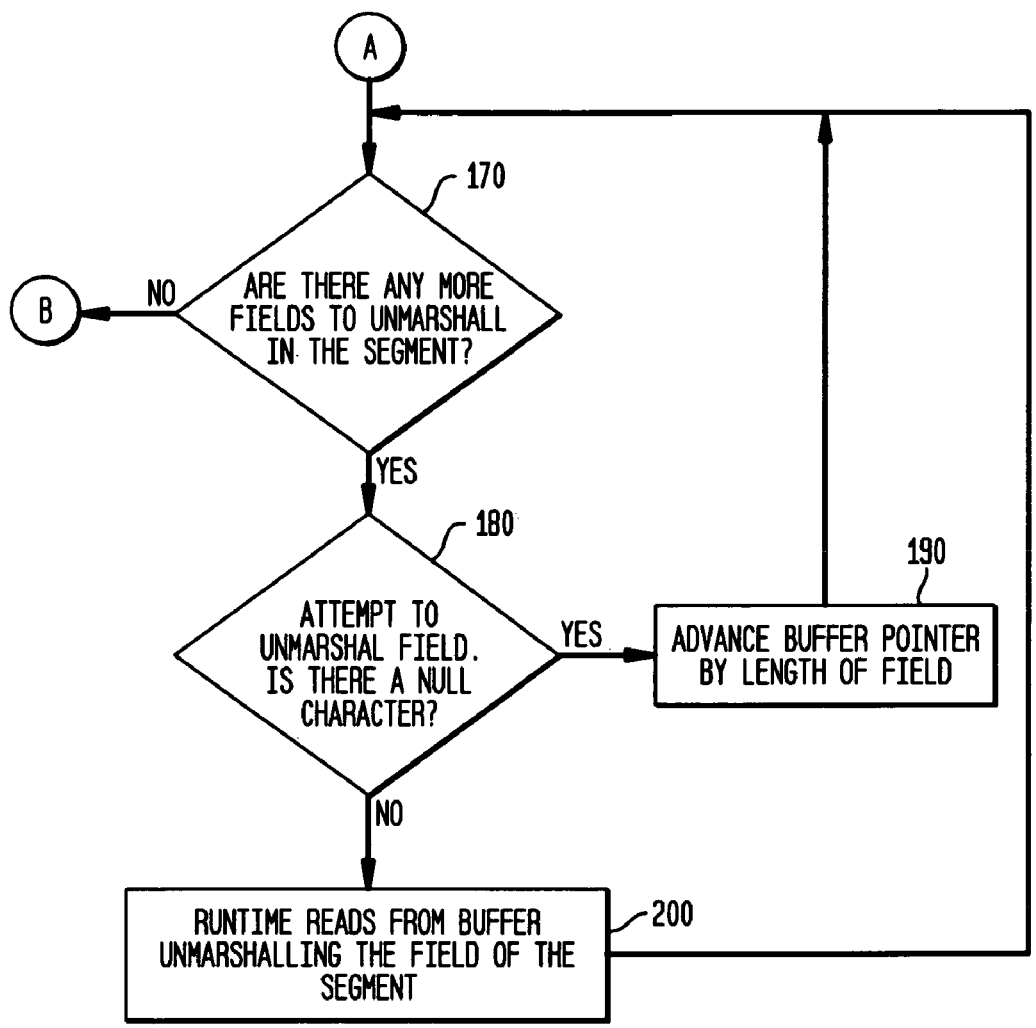

Referring to FIG. 2, the import utility 20 comprises three components: scanner 22, parser 24 and code generator 26. The scanner reads the COBOL IMS transaction source file 10 and generates a stream of: tokens that are input to the parser. The parser interprets the stream of tokens and generates data model code parts corresponding to the contents of the COBOL IMS transaction messages. These parts are then used by the code generator to generate C++ classes 30, the program interface, representing the IMS input and output messages contained in the COBOL IMS transaction source file. Clearly the classes could be generated in computer languages other than C++, typically the language corresponding to the language of the client application. The generated data types of the input and output messages describe the format of the data stream to be sent to the IMS transaction and the format of the reply sent by the IMS transaction back to the C++ program.

In the preferred embodiment, the import utility creates the several C++ constructs as described above, namely a transaction part, a message part and a lpage part, which are used to generate the compiled generated code stub used, in combination with the runtime, to invoke the COBOL IMS transaction through the IBM MQSeries services.

The first construct or part—the main, user specific class, user_class, with a name defined by the user to the import utility—contains the properties and methods needed to communicate with the IMS system. These properties and methods are included in user_class by means of multiple inheritance from generated utility classes, described below, contained in the program runtime classes. These classes include IDAInterfaceBase class, IXDMQIMSConversation class and other member classes of the IBM Open Class® library.

The utility classes generated by the import utility include the user_classDefinition class, the user_class_stub class and the ims_user_class_cstub class. The main purpose of these classes is to provide the abstract definitions properties used by the user_class. The properties provide unique identifiers to identify the class, methods which return Strings containing the signature of user_methods, and an abstract implementation of each user_method.

The user_class also defines the implementation of the user defined method, user_method, as specified by the user to the import utility. The invocation of this method causes interaction with the IMS transaction as understood by the IMS system including sending an input message to the IMS system and receiving an output message from the IMS system. The method expects two arguments corresponding to the input and output messages of the IMS transaction. The messages themselves are user_message classes generated by the import utility from the COBOL data structures representing the input and output messages specified by the user to the import utility.

The second construct or part, a message part—class user_message—provides means for composing or reading an IMS input or output message respectively. Messages exchanged with an IMS system are divided into logical pages or lpages, depicted by way of example in FIG. 3 as lpage 1 and lpage 2, and the user_message class reflects this structure by defining the sequence of lpages as its data member.

Since an l page itself can contain one or more segments and the message can contain two or more logic pages, a third construct or part—a class user_lpage—is defined for each logical page and the generated code 30 contains a class definition for each defined lpage. The segments, depicted by way of example as seg1, seg2, and seg3 in FIG. 3, contained in a lpage are itself classes, generated from the COBOL data structures by the import utility. The multiple segments within a lpage are grouped into a segment sequence. The generated code defines all segments of a particular lpage as the data members of that lpage class. Further, the segments are comprised of fields, depicted by way of example as mfld1, mfld2, mfld3, mfld4 and mfld5 in FIG. 3, which in turn are the basic COBOL data types. The generated code defines all fields of a particular segment as the data members of that segment class.

In all of the generated code 30, the definition of one class as a data member of, or included in, another class implies the existence of the methods to retrieve and set the value of such data member or included class.

In addition to the C++ code described above, the import utility also generates a description of visual and nonvisual parts in a format, in the preferred embodiment, understandable to the Visual Composition Editor included in the IBM VisualAge C++ product. This description includes graphical representations of the user_class and the user_method as well as other generated classes and their data members. This allows the use of the generated code to visually create user applications using the Visual Composition Editor development functionality such as attribute to attribute connections. It should be apparent to those skilled in the art that formats for other visual or non-visual programming tools may be used.

After creation of the generated code by the import utility, the generated code is compiled (as the compiled generated code stub) with the runtime and client application. Of course, in other program language environments, the generated code, the application and the runtime may be not be compiled together rather instead interlinked by other means.

Once compiled together, the client application and program runtime interact with the compiled generated code stub to allow access by the client application to a COBOL IMS transaction.

The program runtime 60 of the present invention comprises a set of C++ classes providing access from the application's system to an IMS system. Specifically, the runtime classes provide means to: translate the simple data types of the language used on the application's system to the COBOL data types used in a message to the IMS system (IDACallHandle class); construct messages in a format understandable by the IMS system (IXDMQIMSCallHandleInternal, IXDMQIMSTransaction and IXDMQIMSConversation classes); exchange the messages with the IMS system using IBM MQSeries services (IXDMQIMSRChnl and IXDMQIMSSChnl classes); read the message returned from the IMS system (IXDMQIMSCallHandleInternal, IXDMQIMSTransaction and IXDMQIMSConversation classes); and translate the simple COBOL data types contained in a message from the IMS system to the data types of the language used on the application's system (IDACallHandle class).

The runtime handling of dynamic IMS system messages is described using an example of the reading of an IMS output message but it is understood that the runtime may also be capable of composing such formatted messages to be sent to an IMS system e.g. as an IMS input message.

As described above, an IMS message can contain multiple lpages, which in turn can contain multiple segments occurring as one or more segment sequences. In any given segment sequence, one or more segments can be omitted. Each segment can contain multiple fields corresponding to the simple data types of the COBOL IMS transaction. Some or all data fields can be omitted. The actual structure of each message, said structure defined by the number of lpages in the message, the number of segment sequences in the lpage, and the number and size of all fields in the segment, is thus really only known at the time of generation of the messages. The ability of the IMS system to reorder lpages and their segment sequences and omit segments and fields prevents direct mapping of the message to a set of generated data structures (classes/types) and thus requires a runtime to read each message and dynamically map the message to the generated data structures (classes/types). The handling of these dynamic messages by the runtime and the compiled generated code of the present invention is described below.

To accommodate all the possible messages, the runtime assumes that a message contains multiple lpages, each with multiple segment sequences, each containing multiple fields. Also, each generated class corresponding to the message, lpage, segment or field, contains the code to unmarshal the corresponding part of the IMS message. This code is combined using the C++ operator overloading mechanism to translate the whole IMS system message.

Initially, the message is copied into a buffer 100 and its length is stored. Until or unless there is no data in the buffer, the runtime reads a sequence of lpages 110.

After making sure the buffer contains data 120 (using the notAtEndOfBuffer method of the InternalCallHandle class), the next step is to verify that the data to be read belongs to the current lpage 130. This verification is done using the notAtEndOfBufferOrSeq method. This method uses the page bit and the lpage condition. The page bit is the fourth byte of the message segment. If its value is 0x40, the segment is the first in the segment sequence of the lpage. The lpage condition consists of a reference value, comparator operator and the offset within the segment. The segment belongs to the lpage when the value at the offset compared, using the comparator operator, to the reference value evaluates to true. This method is used to determine whether the first segment in the segment sequence belongs to the same lpage or is the first segment in the next lpage. If it is the first segment in the next lpage, the next lpage is processed 110. This comparison operation is necessary since a segment sequence for a lpage does not have to contain the same number of elements and can end after any segment.

If the segment belongs to the current lpage, its contents are unmarshalled. First, the runtime verifies that the segment is not a null segment, that is, a segment containing no data 140. Method notNullSegment checks whether the segment length specified in its length field is equal to 5, and if it is, whether the fifth byte of the segment is a null character. The null character is transaction dependent and is defined by the user to the runtime 60. If the segment is empty, no data is read and the buffer pointer is advanced by 5—the length of the empty segment 150. When the segment is not empty, the runtime strips the first four bytes of the segment containing the length and control information 160. This is done by invoking the method stripLL.

The next step is to unmarshal all the fields of the segment 170. Since fields can be omitted, the runtime checks for a null character before attempting to unmarshal a field 180. If the null character is present, the runtime advances the buffer pointer by the length of the field 190. If the field is truncated, that is the null character is not the first one in the field, the runtime only reads into the buffer up to the null character and advances the buffer pointer appropriately 200. The fields and segments differ in that a truncated segment is physically shorter, whereas the field always occupies the same space.

After unmarshaling all the fields in the segment, the runtime verifies that it should continue to unmarshal the current lpage. Besides checking whether there is any more data in the buffer 120 (if there is no more data the unmarshalling is terminated), it verifies that the lpage condition is met and therefore whether the next segment belongs to the same lpage 130. If the condition is not met the runtime starts unmarshalling the next lpage 110. Otherwise, the runtime verifies that the next segment contains data 140. If so, the segment and its fields are processed as described above. If not, the buffer pointer is advanced 150 and unmarshalling continues. In this manner, processing continues until all the data from the message has been retrieved and there is no more data in the buffer 120.

The format of the message sent to the IMS system depends on the state of the conversation between the application and the program on the IMS system. If there is a conversation between the application and the program, the message must not contain the name of the IMS transaction to be invoked, otherwise included in the first segment of the message. The runtime keeps track of the ongoing conversations and verifies that only valid user data is included in the messages sent to the IMS system.

In addition, after every step of the conversation, the runtime writes the conversation identification to a persistent store. This step maintains a state to provide failure recovery. It is necessary because of an IMS structure that does not terminate conversations that are unfinished and leaves them in an inconsistent state. The utility provided as the part of the program runtime allows automatic termination of all suspended conversations once the user program is restarted.

Referring to FIG. 5, the source code of a sample COBOL IMS transaction is provided. Its parts defining input and output messages format are shown between begin and end comments. For the transaction to run correctly the data it receives must match exactly these definitions and therefore they determine the format of the generated C++ code.

FIG. 6 presents a set of generated files containing C++ classes used to compose an input message sent to a COBOL IMS transaction and read an output message returned by the COBOL IMS transaction. It includes complete source of the following files:

myclass.hpp—contains the definition of the user class with the appropriate runtime initialization and a virtual definition of a method used to invoke the COBOL IMS transaction (add).myclass.imc—defines a cstub class providing definition of the method used to invoke the COBOL IMS transaction (add)myclass.hpd—defines stub and Definition abstract classes, superclasses of the above cstub classmyclass.imd—defines classes representing: the input and output messages—myclass_add_O, myclass_add_I; lpages of these messages—myclass_add_Lpage1, myclass_add_Lpage2; and fields of these lpages—myclass_add Lpage1_args, myclass_add_Lpage1 result. myclass.vbe—contains a description of visual parts of the generated code that can be used in the Visual Composition Editor (VCE) of IBM's VisualAge C++ development tool.myclass.cpp—defines notification identifiers used by classes to notify about the change of their state when the generated code is used in the VCE. To use the generated code directly, without using the VCE, the user has to include the header file myclass.hpp, all other files and definitions are included automatically.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the description herein may refer to interactions with the user interface by way of, for example, computer mouse operation, it will be understood that within the present invention the user is provided with the ability to interact with these graphical representations by any known computer interface mechanisms, including without limitation pointing devices such as computer mouses or trackballs, joysticks, touch screen or light pen implementations or by voice recognition interaction with the computer system.

While the preferred embodiment of this invention has been described in relation to the C++ language, this invention need not be solely implemented using the C++ language. It will be apparent to those skilled in the art that the invention may equally be implemented in other computer languages, such as object oriented languages like Java and Smalltalk.

The invention is preferably implemented in a high level procedural or object-oriented programming language to communicate with a computer. However, the invention can be implemented in assembly or machine language, if desired. In any case, the language may be a compiled or interpreted language.

While aspects of the invention relate to certain computer language and other technological specifications (e.g. the Java Language Specification with respect to the Java computer language), it should be apparent that classes, objects, components and other such software and technological items referenced herein need not fully conform to the specification(s) defined therefor but rather may meet only some of the specification requirements. Moreover, the classes, objects, components and other such software and technological items referenced herein may be defined according to equivalent specification(s) other than as indicated herein that provides equivalent or similar functionality, constraints, etc. Accordingly, features, functionality, constraints, etc. may be used other than as defined by the computer language and other technological specification.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include, but is not limited to, CD-ROMs, diskettes, tapes, hard drives, computer RAM or ROM and/or the electronic, magnetic, optical, biological or other similar embodiment of the program. Indeed, the article of manufacture, program storage device or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A method for interfacing an information management system (IMS) program on an IMS system to a program in another program environment, said IMS program receiving and sending input and output messages having variant content, the method comprising the steps of:
   scanning an IMS transaction with the IMS program on the IMS system; and
   using results of said scanning to generate a program interface, the program interface providing means for invoking the IMS transaction, dynamically composing or reading said input or output messages, and dynamically converting data between the IMS transaction and the program in another program environment;
   wherein the interface comprises
   a transaction part which provides for invoking the IMS transaction:
   a message part which provides for composing or reading an IMS message: and
   a logical page (lpage) part which provides for dynamic composing or reading an IMS message.

2. The method of claim 1, further comprising the step of providing a runtime, the runtime comprising:
   means for translating data types of the program in another program environment to data types used in a message to the IMS system;
   means for composing the message to the IMS system;
   means for translating data types used in a message from the IMS system to data types of the program in another program environment; and
   means for reading the message from the IMS system.

3. The method of claim 2, wherein the runtime further comprises means for accessing the IMS transaction via the MQSeries messaging interface.

4. The method of claim 2, further comprising the step of compiling the runtime into the program in another program environment.

5. The method of claim 1, further comprising the step of compiling the program interface into the program in another program environment.

6. The method of claim 1, further comprising the step of providing means for converting code pages between the another program environment and the IMS system.

7. A computer program product readable by machine, tangibly embodying a program of instructions executable by the machine for interfacing an information management system (IMS) program on an IMS system to a program in another program environment, said IMS program receiving and sending input and output messages having variant content, the computer program product comprising:
   instruction means for scanning an IMS transaction with the IMS program on the IMS system; and
   instruction means for using results of said scanning to generate a program interface, the program interface providing means for invoking the IMS transaction and, dynamically composing or reading said input or output messages, dynamically converting data between the IMS transaction and the program in another program environment;
   wherein the interface comprises
   a transaction part which provides for invoking the IMS transaction;
   a message part which provides for composing or reading an IMS message; and
   a logical page (lpage) part which provides for dynamic composing or reading an IMS message.

8. The computer program product of claim 7, further comprising instructions means for providing a runtime, the runtime comprising:
   means for translating data types of the program in another program environment to data types used in a message to the IMS system;
   means for composing the message to the IMS system;
   means for translating data types used in a message from the IMS system to data types of the program in another program environment; and
   means for reading the message from the IMS system.

9. The computer program product of claim 8, wherein the runtime further comprises means for accessing the IMS transaction via the MQSeries messaging interface.

10. The computer program product of claim 8, further comprising instruction means for compiling the runtime into the program in another program environment.

11. The computer program product of claim 7, further comprising instruction means for compiling the program interface into the program in another program environment.

12. The computer program product of claim 7, further comprising instruction means for converting code pages between the another program environment and the IMS system.

13. A computer program product readable by machine, tangibly embodying a program of instructions executable by the machine for interfacing an information management system (IMS) program on an IMS system to a program in another program environment, said IMS program receiving and sending input and output messages having variant content, the computer program product comprising:
   means for scanning an IMS transaction with the IMS program on the IMS system to dynamically compose or read said input or output messages and to produce dynamically a data description of said IMS transaction; and
   means for using said data description to generate code for invoking said IMS transaction;
   wherein the means for scanning includes
   a transaction part which provides for invoking the IMS transaction:
   a message part which provides for composing or reading an IMS message; and a logical page (lpage) part of which provides dynamic composing or reading an IMS message.

14. The computer program product of claim 13, further comprising:

instruction means for using said data description to generate code to process message elements of said IMS transaction for use with the program in another language environment.

15. A computer program product readable by machine, tangibly embodying a program of instructions executable by the machine for interfacing an information management system (IMS) program on an IMS system to a program in another program environment, said IMS program receiving and sending input and output messages having variant content, the computer program product comprising:

instruction means for using information obtained from the IMS program on the IMS system to invoke an IMS transaction with the program on the IMS system; and instruction means for composing or reading said input or output messages and for dynamically converting data between the IMS transaction and the program in another program environment;

wherein the instruction means for composing or reading includes a transaction part which provides for invoking the IMS transaction;

a message part which provides for composing or reading an IMS message; and a logical page (lpage) part which provides for dynamic composing or reading an IMS message.

16. The computer program product of claim 15, wherein the instruction means for converting further comprises:

instruction means for translating data types of the program in another program environment to data types used in a message to the IMS system;

instruction means for composing the message to the IMS system;

instruction means for translating data types used in a message from the IMS system to data types of the program in another program environment; and instruction means for reading the message from the IMS system.

17. The computer program product of claim 15, wherein the instruction means for converting further comprises instruction means for accessing the IMS transaction via the MQSeries messaging interface.

18. The computer program product of claim 15, further comprising instruction means for converting code pages between the another program environment and the IMS system.

19. An article of manufacture readable by machine, tangibly embodying a program of instructions executable by the machine to perform method steps for interfacing an information management system (IMS) program on an IMS system to a program in another program environment, said IMS program receiving and sending input and output messages having variant content, said method steps comprising:

scanning an IMS transaction with the IMS program on the IMS system; and using results of said scanning to generate a program interface, the program interface providing means for invoking the IMS transaction dynamically composing or reading said input or output messages, and dynamically converting data between the IMS transaction and the program in another program environment;

wherein the interface comprises a transaction part which provides for invoking the IMS transaction;

a message part which provides for composing or reading an IMS message; and a logical page (lpage) part which provides for dynamic composing or reading an IMS message.

20. A system for interfacing an information management system (IMS) program on an IMS system to a program in another program environment, said IMS program receiving and sending input and output messages having variant content, the method comprising:

means for scanning an IMS transaction with the IMS program on the IMS system; and means for using results of said scanning to generate a program interface, the program interface providing means for invoking the IMS transaction, dynamically composing or reading said input or output messages, and dynamically converting data between the IMS transaction and the program in another program environment;

wherein the interface comprises a transaction part which provides for invoking the IMS transaction;

a message part which provides for composing or reading an IMS message; and a logical page (lpage) part which provides for dynamic composing or reading an IMS message.

21. The system of claim 20, further comprising means for providing a runtime, the runtime comprising:

means for translating data types of the program in another program environment to data types used in a message to the IMS system;

means for composing the message to the IMS system;

means for translating data types used in a message from the IMS system to data types of the program in another program environment; and means for reading the message from the IMS system.

22. A system for interfacing an information management system (IMS) program on an IMS system to a program in another program environment, said IMS program receiving and sending input and output messages having variant content, the method comprising:

means for scanning an IMS transaction with the IMS program on the IMS system to dynamically compose or read said input or output messages and to produce dynamically a data description of said IMS transaction; and means for using said data description to generate code for invoking said IMS transaction;

wherein the means for scanning includes a transaction part which provides for invoking the IMS transaction;

a message part which Provides for composing or reading an IMS message; and a logical page (lpage) part which provides for dynamic composing or reading an IMS message.

23. The system of claim 22, further comprising:

means for using said data description to generate code to process message elements of said IMS transaction for use with the program in another language environment.

24. A system for interfacing an information management system (IMS) program on an IMS system to a program in another program environment, said IMS program receiving and sending input and output messages having variant content, the method comprising:

means for using information obtained from the IMS program on the IMS system to invoke an IMS transaction with the IMS program on the IMS system; and means for composing or reading said input or output messages and for converting dynamically converting data between the IMS transaction and the program in another program environment;

wherein the means for composing or reading includes a transaction part which provides for invoking the IMS transaction;

a message part which provides for composing or reading an IMS message; and a logical page (lpage) part which provides for dynamic composing or reading an IMS message.

25. The system of claim 24, wherein the means for converting further comprises:

means for slating data types of the program in another program environment to data types used in a message to the IMS system;

means for composing the message to the IMS system;

means for translating data types used in a message from the IMS system to data types of the program in another program environment; and means for interpreting the message from the IMS system.

26. A method for interfacing an information management system (IMS) program on an IMS system to a program in another program environment, comprising:

scanning an IMS transaction with the IMS program, the IMS program being configured to receive and send input and output messages having variant content;

generating a program interface using results of the scanning;

invoking the IMS transaction;

dynamically composing or reading the input and output messages; and dynamically converting data between the IMS transaction and the program in another program environment;

wherein, the program interface comprises a transaction part configured to perform the invoking, a message part configured to perform the dynamically composing or reading the input and output messages, and a logical page (lpage) part configured to perform the dynamically converting data.

\* \* \* \* \*